(12) United States Patent
Briggs et al.

(10) Patent No.: US 7,363,427 B2
(45) Date of Patent: Apr. 22, 2008

(54) MEMORY CONTROLLER CONNECTION TO RAM USING BUFFER INTERFACE

(75) Inventors: Theodore Carter Briggs, Plano, TX (US); John Michael Wastlick, Allen, TX (US); Gary Belgrave Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 10/756,446

(22) Filed: Jan. 12, 2004

(65) Prior Publication Data
US 2005/0154820 A1 Jul. 14, 2005

(51) Int. Cl.
*G06F 12/00* (2006.01)

(52) U.S. Cl. .................. 711/118; 711/100; 711/101; 711/104; 711/105; 711/117; 365/189.01; 365/189.05

(58) Field of Classification Search ............... 711/118, 711/117, 105, 104, 101, 100; 365/189.01, 365/189.05
See application file for complete search history.

(56) References Cited

U.S. PATENT DOCUMENTS

| | | | | |
|---|---|---|---|---|
| 4,796,232 | A * | 1/1989 | House | 365/189.03 |
| 5,226,144 | A | 7/1993 | Moriwaki et al. | |
| 5,765,196 | A * | 6/1998 | Liencres et al. | 711/143 |
| 5,829,040 | A | 10/1998 | Son | |
| 5,966,728 | A | 10/1999 | Amini et al. | |
| 6,122,659 | A | 9/2000 | Olnowich | |
| 6,122,712 | A | 9/2000 | Torii | |
| 6,298,418 | B1 | 10/2001 | Fujiwara et al. | |
| 6,363,444 | B1 * | 3/2002 | Platko et al. | 710/110 |
| 6,490,660 | B1 | 12/2002 | Gilda et al. | |
| 6,546,464 | B2 * | 4/2003 | Fortuna et al. | 711/141 |
| 6,564,302 | B1 | 5/2003 | Yagi et al. | |
| 6,564,306 | B2 | 5/2003 | Dugan et al. | |
| 6,591,348 | B1 | 7/2003 | Deshpande et al. | |
| 6,601,144 | B1 | 7/2003 | Arimilli et al. | |
| 6,629,205 | B2 | 9/2003 | Cypher | |
| 6,651,143 | B2 | 11/2003 | Mounes-Toussi | |
| 6,678,789 | B2 * | 1/2004 | Shibayama | 711/117 |
| 6,839,806 | B2 * | 1/2005 | Murakami et al. | 711/118 |
| 6,853,643 | B1 * | 2/2005 | Hann et al. | 370/413 |
| 6,874,116 | B2 * | 3/2005 | Walker et al. | 714/763 |
| 2001/0034815 | A1 * | 10/2001 | Dugan et al. | 711/118 |
| 2001/0052060 | A1 * | 12/2001 | Bao | 711/167 |
| 2002/0120829 | A1 * | 8/2002 | Murakami et al. | 712/207 |
| 2003/0163776 | A1 * | 8/2003 | Prasad | 714/752 |
| 2003/0177320 | A1 * | 9/2003 | Sah et al. | 711/158 |
| 2004/0117566 | A1 * | 6/2004 | McClannahan et al. | 711/154 |

FOREIGN PATENT DOCUMENTS

EP 0369773 5/1990

\* cited by examiner

*Primary Examiner*—Stephen C. Elmore
*Assistant Examiner*—Daniel Kim

(57) ABSTRACT

A memory subsystem controller and buffer for a computer and a second buffer for memory tag operations. The buffers are linked to the memory controller by two bidirectional data busses. The controller operates the memory subsystem by passing memory addresses to the memory subsystem data bus through the buffers. Unidirectional control interfaces between the controller and the buffers provide memory control commands to both buffers and memory tag information to the tag buffer. The controller performs read and write operations to memory, normally interleaving a plurality of read operations with a plurality of write operations. The read and write data is temporarily stored on the buffer devices while other operations are being executed to optimize the data bandwidth of the memory subsystem of the computer.

6 Claims, 2 Drawing Sheets

MEMORY CONTROLLER CONNECTION TO RAM USING BUFFER INTERFACE

BACKGROUND

Computing systems are being developed with faster processors to increase the speed with which the computer is able to execute increasingly complex applications for business, personal use, and entertainment. The constantly increasing speed of the processors places more rigorous performance demands on all of the other subsystems in the computer. This is true of the memory subsystem in particular, where data is stored, accessed, and updated countless times during the operation of a software application.

The memory subsystem of most computers is normally operated by a memory controller. The task of a memory controller is to move data between the computer's memory subsystem and its one or more processors as quickly and efficiently as possible. The time consumed by memory read/write operations is a major factor in the ultimate speed and efficiency of a computer system. A computer's memory subsystem often comprises memory devices that employ different technologies, such as static RAM (SRAM) and dynamic RAM (DRAM). Dynamic RAM is slower because the access time for reading from and writing to a memory cell is longer than that of a SRAM device. Static RAM is often used for the cache memory where data used repeatedly by program operations is stored for fast read/write operations. The task of the memory controller is to optimize the bandwidth of the memory subsystem; that is, the controller must maximize the amount of data that the computer memory can process in read/write operations during program operations.

Where the controller must directly handle the data exchanges with the memory subsystem its task is difficult because of the overhead in time and task execution that it must carry. If some of that load could be passed to another part of the memory subsystem, more efficient data access and storage would be possible.

In the description that follows, all references to RAM include any form of read/write random access memory.

SUMMARY

The present invention optimizes the connection of a memory controller to the RAM in the memory subsystem using a buffer to interface with the memory. The buffer functions to pass data between the controller and the RAM in a computer's memory subsystem. In directory-based cache coherent memory subsystems, a second buffer device that serves as the TAG buffer can increase performance. The controller and buffers are connected by a Memory Interface Data (MID) bus, over which all data exchanges between the controller and buffer occur. The buffer is, in turn, connected to the computer's memory subsystem data bus for system memory access. Separating the memory controller from direct connection to the memory subsystem increases the realized bandwidth by conducting long sequences of read and write operations on the MID and RAM busses, reducing the number of bus "turns" (driving the MID and RAM busses in different directions) and avoiding the dead time on the memory busses that frequent turns require (the setting time for data and strobe bits).

Discrete Memory Interface Address (MIA) and Memory Interface Control (MIC) busses between the controller and the buffers permit the controller to send memory control commands to the buffers at a higher rate. The MIA address information, which accesses blocks of RAM, is directly fanned out to the RAM. MIA RAM control signals are also buffered and relayed by the buffer devices to the memory subsystem. A Memory Interface TAG (MIT) bus sends TAG information from the controller to the TAG buffer.

BRIEF DESCRIPTION OF THE DRAWINGS

For the purpose of illustrating the invention, there are shown in the drawings forms which are presently preferred, it being understood, however, that this invention is not limited to the precise arrangements and embodiments shown.

DETAILED DESCRIPTION

The invention comprises a combination of a memory controller and one or more high speed memory buffer devices. The buffer provides high speed data transfer, including memory address and command control, in a multiprocessor computing system between main memory and the system processors. The buffer device can hold multiple cycles of memory read and write data. One buffer serves as a TAG buffer. The combination of the memory controller with buffer devices provides a way to achieve a higher percentage of realized bandwidth in a directory based memory system. An exemplary description of one embodiment of such a combination follows, though variations of the described embodiment are feasible. The following description refers to the system memory uniformly in terms of DRAM, though that reference is not intended to limit all system memory to DRAM technology.

Figure 1:
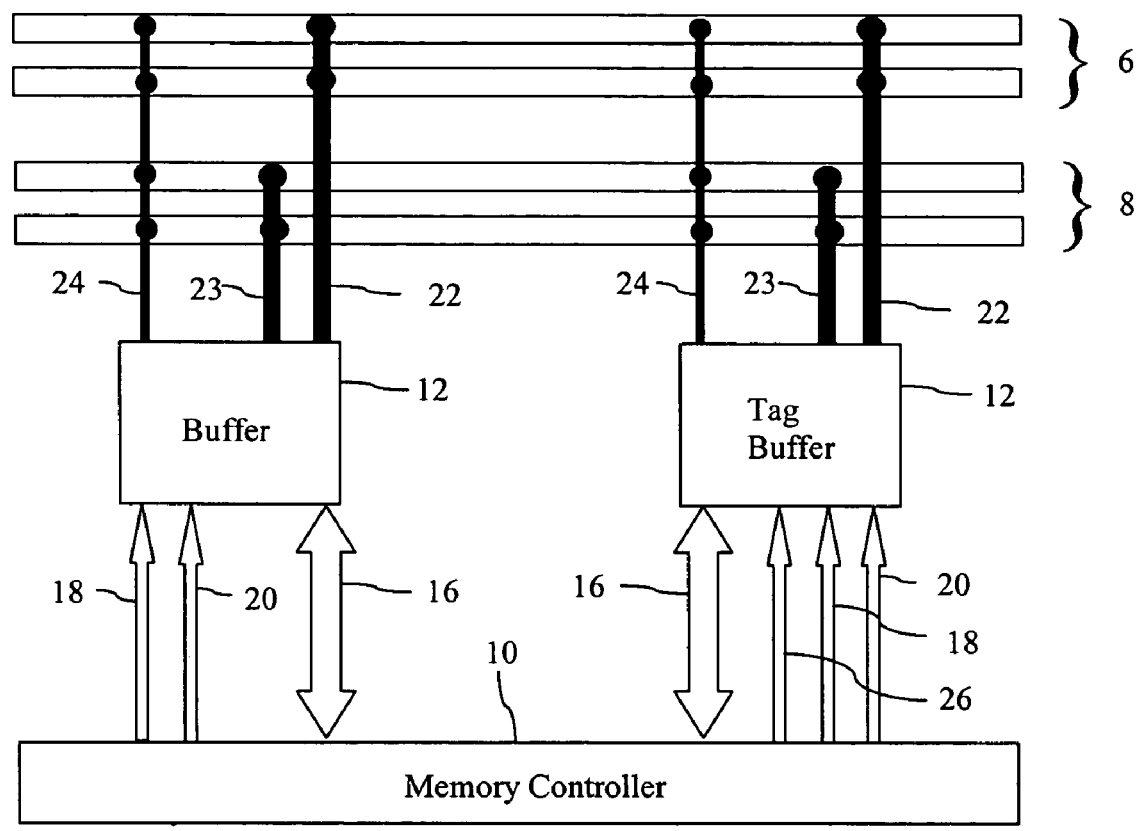
FIG. 1 is a schematic diagram of a controller and buffer combination according to the described embodiment of the invention.

Referring to FIG. 1, memory control and data interface is provided by a controller device 10 that connects with one or more buffer devices 12. In a computing system where memory tags are employed, a second buffer 12 serves as the tag buffer. The data enters and exits the controller 10 on four 72-bit wide MID (Memory Interface Data) busses 16. Each bus 16 runs at 533 MT/s and is bit-sliced between two buffer 12 devices. Each MID bus 16 functions independently of the other and has a MIA (Memory Interface Address) bus 18 that goes to its associated DRAM DIMMs (Dual In-Line Memory Modules). The DRAM bus is 144 bits wide and runs at 533 MT/s with two 72-bit DRAM bus segments 6, 8 (DRAM-A 6, and DRAM-B 8) accessed in parallel. The buffer 12 is linked to the DRAM segments 6, 8 by the bDRAM busses 22, 23. Two bit-sliced buffers 12 transfer data between the bDRAM interfaces 22, 23 on the buffer 12 and the MID busses 16, with each buffer connecting to 36 bits from the MID bus 16 and 144 bits from two bDRAM busses 22, 23. Controller 10 issues transactions on the MIC (Memory Interface Command) bus 20.

The MIA bus 18 comes from controller 10 and is decoded and sent to the DRAM DIMMs as the DAC (Data Address Control) bus 24. The MIA 18 runs at 533 MT/s and the DAC 24 runs at 267 MHz. Only every other DAC cycle may be used since it takes 7.5 nsec to send a single command across the MIA bus 18 in the described embodiment. The MIA bus 18 is parity protected by using the MIC 20 parity bits.

Each MID bus 16 on the controller 10 is bit-sliced into two 36-bit bi-directional slices, each feeding one buffer 12. Each buffer 12 drives two 72-bit bi-directional DRAM busses 6, 8, DRAM-A 6 and DRAM-B 8. The MID bus 16 on each buffer 12 is divided into two 18-bit groups with four strobe pins each.

The controller 10 and buffer 12 devices are connected by the high speed bidirectional MID bus 16 and several unidirectional control busses 18, 20, 26 that run from the controller 10 to the buffer devices 12. The buffer devices 12 each connect to a bit-slice of two logical DRAM busses in the described embodiment. The controller 10 controls the buffers 12 through the MIC bus 20 and the MIT (Memory Interface TAG) bus 26 (for the TAG buffer only). The controller controls the DRAM by sending address and control signals over the MIA bus 18 and MIC bus 20 to the buffers 12. The buffers decode the addresses and control signals and fan them out on the DRAM Address and Control (DAC) bus 24. The buffers 12 read and write to the DRAM busses 6, 8 and can perform TAG modify operations. In other embodiments, more logical DRAM busses could be used depending on the relative bandwidths of the MID and DRAM busses.

The memory controller 10 is responsible for scheduling transactions to the DRAM busses 6, 8 (DRAM-A 6, and DRAM-B 8) to maximize overall bandwidth. It receives reads, writes and update tag instructions from the memory coherency control block. The transactions can be for either of the two DRAM busses 6, 8. The controller 10 can reorder these transactions as needed to maximize bandwidth.

Buffer 12 is the memory buffer device. Its primary function is to stream data between the controller 10 chip and the RAM in the memory subsystem. The two buffers 12 transfer one cache line over the MID bus 16 in 16 533 MT/s cycles and over the buffer bDRAM bus interfaces 22, 23 in four 533 MT/s cycles. One of the buffers 12 is designated as the TAG buffer and receives the MIT bus 26.

Figure 2:
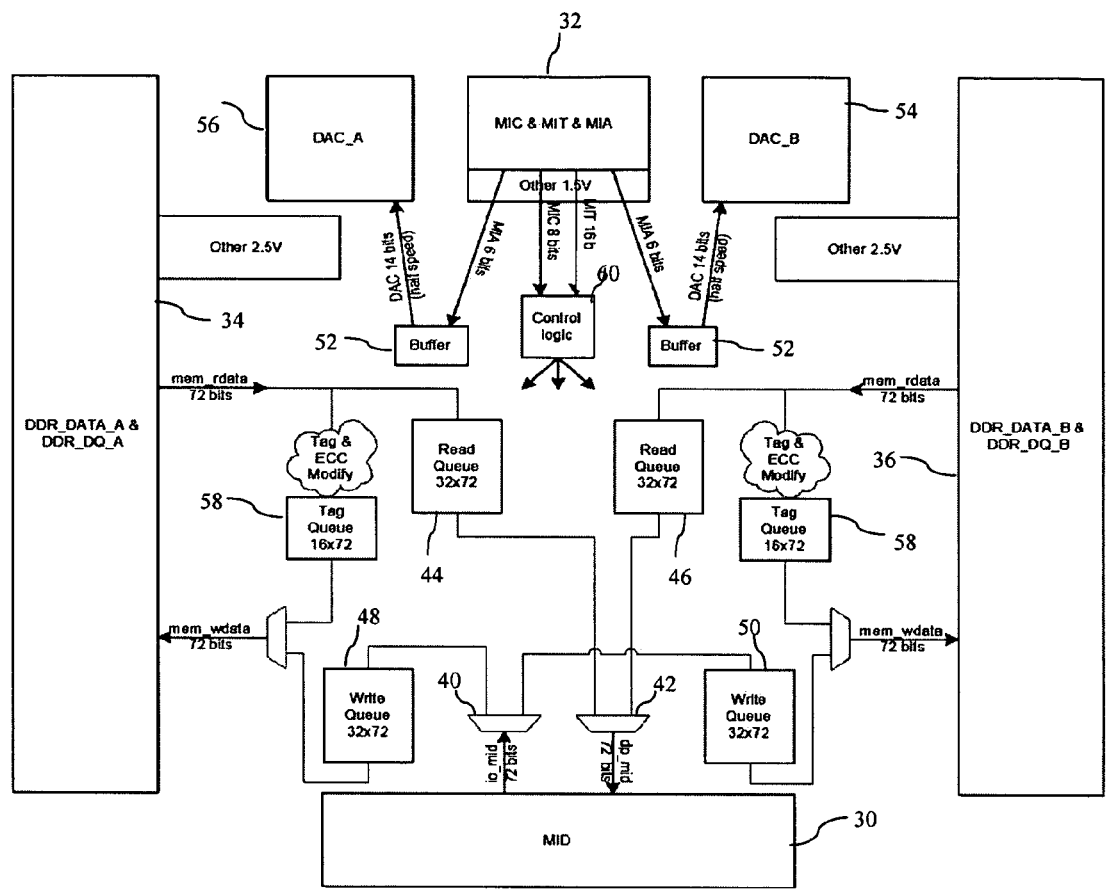
FIG. 2 is a functional diagram of a buffer device according to the described embodiment of the invention.

Referring to FIG. 2, a buffer 12 comprises the MID bus interface 30 and a MIC, MIA and MIT bus interface 32. Data being written to the system RAM enters the buffer 12 through the MID interface 30 and is queued in the WRITE queues 48, 50. These queues are dedicated to pass data to the A and B sides of the RAM bus through the RAM bus interfaces 34, 36. A pair of READ queues 44, 46 buffer data read from the system DRAM-A and -B busses through the DRAM bus interfaces 34, 36. From these READ queues 44, 46 the data passes to the controller through the MID bus interface 30.

Address and control information from the controller 10 are sent to the buffer 12 on the MIC, MIA and MIT busses through an interface 32. The address information is routed to a pair of isolation (not storage) buffers 52, decoded and fanned out to the system DAC bus 24 (FIG. 1) through the DAC bus interfaces 54, 56. The memory control and memory tag information is directed to control logic 60 in the buffer for decoding and execution, and for tag updates through the TAG queues 58.

The buffer 12 forwards data read from the DRAMs directly to the MID bus 16. The buffer 12 can also store up to eight copies of the first two cycles of data from the DRAMs and update the TAG and Error Correction Code (ECC) for later write back. Four cache lines can be read in over the MID bus 16 and stored in the buffer 12 at a time. Data to the DRAMs can be taken from the TAG cycle storage, cache line storage or directly from the MID bus. Up to four cache lines of data can be kept in the read queues for each side of memory.

Buffer 12 is a memory buffer between controller 10 and the DIMMs and supports the following features:

1. Performs directory TAG updates without using MID bus bandwidth
2. Calculates new sharing list or new owner based on TAG command
3. Calculates new ECC for new cacheline state
4. MIA bus decode and fanout
5. Buffer up to four cache lines for later writes
6. Buffer up to eight SDRAM cycles for TAG update
7. Supports correction of single x4 memory failure or single MID wire failure
8. Supports stop-and-scan, IEEE 1149.1 Test Access Port (TAP) specifications
9. Supports up to two DDR-II 533 MT/s modules per DRAM data bus (eight DIMMs per two buffers 12)
10. Reports internal control states to controller 10 via MID using DIAGNOSE command
11. Supports DIMM address parity error detection
12. Supports MIC and MIT parity error detection A read operation from main memory operates as follows. The scheduler uses the MIA bus to send a ROW ACTIVATE command to the DRAM. The buffer receives address information from the controller over the MIA bus and fans it out to the DRAM's—it is not stored in the buffer. The controller issues a COLUMN READ command, which causes the DRAM to send the data addressed by the MIA to be sent out on the DRAM data bus for the length of its burst time. The controller controls the buffer via the MIC bus to write this "read" data into the read buffer on the buffer. The first of four chunks of data contains the "tag". This is modified based on information the controller sends to the buffer on the MIT bus. This tag is written to the "tag" queue in the buffer. Later the controller writes this "tag" back to main memory. It does not re-write the rest of the non-modified data. The controller causes the buffer through MIC bus commands to send the read data on the MID bus back to the controller.

Update tag operations are similar but since the controller updates only the tag portion of the data, the RAM data is not written to the read queue on the buffer nor transferred to the controller across the MID bus. Update tags are a special transaction in a directory-based cache coherent system. The processors access main memory in cache line size chunks. Each cache line as stored in main memory in a directory based system has extra information stored with the data. This information is the "tag" and contains information to help maintain coherency. The update tag transactions modify this information without reading or writing the rest of the cache line.

For a common write operation, the controller causes data to be sent on the MID bus from the controller to the buffer. The data is stored in the buffer write queue until it is time to write it to main memory. The controller must send a ROW ACTIVATE command over the MIC bus, after which it writes the data with the COLUMN WRITE command. The controller operates the buffer via the MIC bus to source the data from the write queue to coordinate with the address information that is delivered over the MIA bus.

The memory controller and buffer optimize the data bandwidth of the memory subsystem by interleaving the read, write and tag update operations. The controller issues sequences of these three transaction types to maximize bandwidth. An exemplary sequence may comprise two writes, four reads and two tag updates. The write data is sent to the buffer write queue while some of the write and read ROW ACTIVATE commands are being executed. The first of the four reads is started as soon as possible after the ROW ACTIVATE command to get the read data flowing back into the read queues in the buffer. As soon as the write data has passed over the MID bus, the read data is pulled across from the read queues into the controller. Meanwhile the write data is written to the DRAM busses and the tags updates for the reads are written to memory. Thus, the controller is reading data while the buffer writes data to memory and updates tags. This function sharing optimizes data bandwidth overall.

In normal operation the buffer 12 receives commands over the MIC bus at an effective rate of 133 MHz. The wire length and deskew register stages delay the commands somewhat and create an 8 nsec to 16 nsec delay between the command being issued at controller 10 and the buffer 12 responding to it. The buffer 12 will not do multi-cycle commands and usually requires a new command each 133 MHz cycle.

In order to interpret data correctly on the MID bus 16, buffer 12 and controller 10 must establish a phase relationship with each other that matches the DRAM clock phase. The two start bits in the MIC are used to establish phase between a buffer 12 and controller 10. The MIT bus 26 needs an idle command with good parity until a command is issued. The buffer 12 leaves the MID bus 16 in tri-state after reset until instructed to drive data on it. All three busses use the same link technology and have strobes that are initialized with a common protocol.

The buffer 12 operates nominally at 267 MHz but can run at least 5% above this speed. A cache line contains 1024 data bits, 96 bits of ECC, 26 bits of directory tag and two unused bits. A line is transferred over the MID bus in eight 267 MHz cycles on both edges of the clock. Each 267 MHz cycle contains 12 bits of ECC, 24 bits of ECC are used to protect 288 bits of data, including the ECC code bits. All of the data on one MID bus wire for a cache line resides in one physical DRAM at the DIMMs. This arrangement allows any one DRAM chip or MID bus wire to fail and still be corrected by the controller 10.

Each buffer 12 is connected to 36 MID wires. The I/O logic translates this 36-bit wide 533 MT/s stream of data into an internal 72-bit bus running at 267 MHz. The DRAM I/O synchronizes data at 267 MHz between the buffer 12 core and the strobes from the DRAM.

There are three categories of external interfaces on the buffer 12: configuration, control and datapath. Configuration pins set the buffer 12 up so it operates in the correct functional and electrical modes. Normally these signals are tied to either VDD or GND on the cell board. Control is effected by the two uni-directional busses, MIC 20 and MIT 26, between the controller 10 and a buffer 12. The datapath comprises the MID bus 16 and bDRAM busses 22, 23.

A MODE bit sets one buffer 12 to be the TAG buffer. This also flips the sides of DRAM and the order of the DAC. The MIA 18 carries the address and control signals from controller 10 to buffer 12. It runs at 533 MT/s and is seven bits wide. It is decoded and sent to the DAC bus 22. The DAC 22 is the decoded version of the MIA bus 18 and is thirty bits wide and runs at 267 MHz. It controls the memory RAM.

The MIC bus 20 is a four bit wide bus with each pin running at 533 MT/s with parity protection on each cycle. It is electrically a part of the MIT 26 and MIA 18 link group but logically separate. A command on the MIC 20 takes four cycles to send, or 7.5 nsec. The DRAM 22 and MID bus 16 interfaces are controlled separately. The MID, DRAM side A and DRAM side B commands can all be started separately on any 267 MHz cycle.

The following description of bit formats are exemplary and not intended to suggest that they are the only formats that can be implemented to operate the combination cache controller and buffer. They are included for the purpose of presenting a complete description.

The physical bits on the MIC 20 are arranged as shown in Table 2-1:

TABLE 2-1

MIC physical bit order

| Cycle | Bit 3 | Bit 2 | Bit 1 | Bit 0 |
|---|---|---|---|---|
| 0 | Parity (last 2 cycles) | MID Start | DRAM_A Start | DRAM_B Start |
| 1 | MID_CMD [1] | MID_CMD [0] | DRAM_CMD_A [0] | DRAM_CMD_B [0] |
| 2 | Parity (last 2 cycles) | MID_CMD [2] | DRAM_CMD_A [1] | DRAM_CMD_B [1] |
| 3 | MID_CMD [4] | MID_CMD [3] | DRAM_CMD_A [2] | DRAM_CMD_B [2] |

The command encodings are:

TABLE 2-2

DRAM command encoding

| Operation Type | Abbreviation | DRAM_CMD [2:0] |
|---|---|---|
| NOP | NP | 3'b000 |
| Read into read queue (Read Data) | RD | 3'b001 |
| Read into TAG queue only (Read TAG) | RT | 3'b010 |
| Read into read and TAG queue (Read All) | RA | 3'b011 |
| Write from TAG FIFO (Write TAG) | WT | 3'b100 |
| Write from line FIFO (Write Data) | WD | 3'b101 |
| Read; Write from TAG FIFO (Read/Write) | RW | 3'b111 |

TABLE 2-3

MID commands

| Operation | Abbreviation | MID_CMD [4:0] |
|---|---|---|
| NOP | NP | 5'b00000 |
| Reset | RS | 5'b00001 |
| Read Diagnose data | DD | 5'b00010 |
| Read from side A | RD_A | 5'b01000 |
| Read from side B | RD_B | 5'b01001 |
| Write to side A | W_A | 5'b01010 |
| Write to side B | W_B | 5'b01011 |
| Read A, write A | RA_WA | 5'b01100 |
| Read A, write B | RA_WB | 5'b01101 |
| Read B, write A | RB_WA | 5'b01110 |
| Read B, write B | RB_WB | 5'b01111 |
| Set mode register | SET_MR_A | 5'b100xx |
| Set mode register | SET_MR_B | 5'b101xx |
| Set mode register | SET_MR_DIMM | 5'b110xx |
| Set mode register | SET_MR_MISC | 5'b111xx |

The MIT bus 26 runs at 533 MT/s using the same type of link as the MID bus 16. The TAG_STB pins (positive _H and negative _L) provide timing deskew for the MIT. The TAG op code and the new TAG data are sent to the TAG buffer in four transfers. The parity on each transfer is ODD. For the non-TAG buffer this bus will be ignored as long as the MODE[1] pin is pulled low.

The tags are stored in one ECC domain in the first cycle of data from the DRAM. There are 26 TAG bits per line whose format varies depending on the state, idle bit and the most-significant-bit of the virtual index.

TABLE 2-8

MIT Command Encoding

| CLK | 7 | 6 | 5 | 4 | 3 | 2 | 1 | 0 |
|---|---|---|---|---|---|---|---|---|
| 0 | start | Agent[0] | tag_op[5] | tag_op[4] | tag_op[3] | tag_op[2] | tag_op[1] | tag_op[0] |
| 1 | parity | rel_cell[5] | rel_cell[4] | rel_cell[3] | rel_cell[2] | rel_cell[1] | rel_cell[0] | Agent[1] |
| 2 | Side | VI[0] | Alias[5] | Alias[4] | Alias[3] | Alias[2] | Alias[1] | Alias[0] |
| 3 | parity | VI[7] | VI[6] | VI[5] | VI[4] | VI[3] | VI[2] | VI[1] |

The tag_op command tells the TAG buffer what modifications to make to the tag. The combination of the tag_op and the current TAG state result in the TAG buffer 12 making the transition to one of the following states:

UPT—Update TAG sets the idle bit and preserves the rest of the tag
NOP—Preserves all of the TAG bits
IS—Idle state
RP—RIO Private
PP—CPU Private
SS—Shared insert (overwrite share list)
SA—Shared Add (add to the sharing list)
SN—Shared NOP (keep old sharing list)

Most of the time the TAG state is used to select two bits in the tag_op to find the correct next state but there are three exceptions for NOP, update TAG and RIO private. The valid TAG states are:

I—Idle
RP—RIO Private
PP—CPU Private
SH—Shared

TABLE 2-9 tag_op encoding

| tag_op | TAG State | Operation |
|---|---|---|
| 00 00 00 | Any | NOP |
| 00 11 10 | Any | RP |
| 00 11 11 | Any | UPT |
| 00 xx xx | I, RP | RP |
| 01 xx xx | I, RP | PP |
| 10 xx xx | I, RP | SS |
| 11 xx xx | I, RP | IS |
| xx 00 xx | PP | PP |
| xx 01 xx | PP | SS |
| xx 10 xx | PP | SA |
| xx 11 xx | PP | IS |
| xx xx 00 | SH | PP |
| xx xx 01 | SH | SN |
| xx xx 10 | SH | SA |
| xx xx 11 | SH | IS |

TABLE 2-10

Coherency State Encodings

| I, State[1:0], VI[7] | State |
|---|---|
| 1xxx | Idle (from a Update TAG) |
| 0000 | Idle |
| 0001 | RIO Private |
| 001x | CPU Private |
| 010x | CPU Shared (2 cells/bit format) |
| 011x | CPU Shared (8 cells/bit format) |

TABLE 2-11

TAG Fields

| I | Idle bit - set by update TAG |
|---|---|
| PS | Poison bit |
| STATE[1:0] | Line state |
| CELL[5:0] | Cell number of owner |
| AGENT[1:0] | CPU or RIO cache indicator |
| VI[7:0] | Virtual Index |
| ALIAS[5:0] | Alias |
| SHARE_MASK[7:0] | Sharing list: Each bit indicates cells that have a copy of this line. |

I PS STATE[1:0] CELL[5:0] AGENT[1:0] 0xxx_xxxx ALIAS[5:0]

The MIA bus 18 comes from controller 10 and is decoded and sent to the DRAMM DIMMs as the DAC bus 24. The MIA runs at 533 MT/s and the DAC runs at 267 MHz. Only every other DAC cycle may be used since it takes 7.5 nsec to send a single command across the MIA bus 18. The MIA bus 18 is parity protected by using the MIC parity bits. The DAC bus 24 will have two pins for each logical signal for electrical fanout reasons. Note that the CS bits are encoded in the MIA 18 but decoded on the DAC 24. The ODT pins are controlled by logic in the buffer 12 that will look for a read or write command and use the ODTDL bits, CS and the MR settings to assert the ODT signals at the right time. The ODTDL indicates how long after the read or write to wait before asserting ODT, the rest determine which ODT pins are asserted. Note that the ODT[0] signal is routed to the same DIMM as the CS[0] and CS[2] signals and similarly ODT[1] will go with CS[1] and CS[3].

TABLE 2-16

MIA encoding (TAG Buffer 12)

| CLK | 6 | 5 | 4 | 3 | 2 | 1 | 0 |
|---|---|---|---|---|---|---|---|
| 0 | Start (1) | CKE | WE | CAS | RAS | CS[1] | CS[0] |
| 1 | ADDR[0] | ODTDL[2] | ODTDL[1] | ODTDL[0] | BANK[2] | BANK[1] | BANK[0] |
| 2 | ADDR[7] | ADDR[6] | ADDR[5] | ADDR[4] | ADDR[3] | ADDR[2] | ADDR[1] |
| 3 | ADDR[14] | ADDR[13] | ADDR[12] | ADDR[11] | ADDR[10] | ADDR[9] | ADDR[8] |

TABLE 2-17

DAC ordering

| Pin Name | TAG Buffer 12 function | Non-TAG Buffer 12 function |
|---|---|---|
| DAC0[0] | DAC0_ADDR[00] | DAC0_ADDR[02] |
| DAC0[1] | DAC0_ADDR[01] | DAC0_ADDR[00] |
| DAC0[2] | DAC0_ADDR[02] | DAC0_ADDR[10] |
| DAC0[3] | DAC0_ADDR[03] | DAC0_BANK[1] |
| DAC0[4] | DAC0_ADDR[04] | DAC0_BANK[0] |
| DAC0[5] | DAC0_ADDR[05] | DAC0_RAS |
| DAC0[6] | DAC0_ADDR[06] | DAC0_WE |
| DAC0[7] | DAC0_ADDR[07] | DAC0_CS[0] |
| DAC0[8] | DAC0_ADDR[08] | DAC0_CS[1] |
| DAC0[9] | DAC0_ADDR[09] | DAC0_CAS |
| DAC0[10] | DAC0_ADDR[10] | DAC0_ADDR[01] |
| DAC0[11] | DAC0_ADDR[11] | DAC0_ODT[0] |
| DAC0[12] | DAC0_ADDR[12] | DAC0_CS[2] |
| DAC0[13] | DAC0_ADDR[13] | DAC0_BANK[2] |
| DAC0[14] | DAC0_ADDR[14] | DAC0_ADDR[13] |
| DAC0[15] | DAC0_APAR | DAC0_APAR |
| DAC0[16] | DAC0_BANK[0] | DAC0_ADDR[04] |
| DAC0[17] | DAC0_BANK[1] | DAC0_ADDR[03] |
| DAC0[18] | DAC0_BANK[2] | DAC0_ODT[1] |
| DAC0[19] | DAC0_CAS | DAC0_ADDR[09] |
| DAC0[20] | DAC0_CKE | DAC0_CS[3] |
| DAC0[21] | DAC0_CS[0] | DAC0_ADDR[08] |
| DAC0[22] | DAC0_CS[1] | DAC0_ADDR[07] |
| DAC0[23] | DAC0_CS[2] | DAC0_ADDR[12] |
| DAC0[24] | DAC0_CS[3] | DAC0_CKE |
| DAC0[25] | DAC0_ODT[0] | DAC0_ADDR[11] |
| DAC0[26] | DAC0_ODT[1] | DAC0_ADDR[14] |
| DAC0[27] | DAC0_RAS | DAC0_ADDR[05] |
| DAC0[28] | DAC0_WE | DAC0_ADDR[06] |
| DAC1[0] | DAC1_ADDR[00] | DAC1_ADDR[03] |
| DAC1[1] | DAC1_ADDR[01] | DAC1_ADDR[00] |
| DAC1[2] | DAC1_ADDR[02] | DAC1_ADDR[10] |
| DAC1[3] | DAC1_ADDR[03] | DAC1_BANK[1] |
| DAC1[4] | DAC1_ADDR[04] | DAC1_RAS |
| DAC1[5] | DAC1_ADDR[05] | DAC1_WE |
| DAC1[6] | DAC1_ADDR[06] | DAC1_BANK[0] |
| DAC1[7] | DAC1_ADDR[07] | DAC1_CS[1] |
| DAC1[8] | DAC1_ADDR[08] | DAC1_CS[0] |
| DAC1[9] | DAC1_ADDR[09] | DAC1_ODT[0] |
| DAC1[10] | DAC1_ADDR[10] | DAC1_ADDR[02] |
| DAC1[11] | DAC1_ADDR[11] | DAC1_CS[2] |
| DAC1[12] | DAC1_ADDR[12] | DAC1_CAS |
| DAC1[13] | DAC1_ADDR[13] | DAC1_BANK[2] |
| DAC1[14] | DAC1_ADDR[14] | DAC1_ODT[1] |
| DAC1[15] | DAC1_APAR | DAC1_APAR |
| DAC1[16] | DAC1_BANK[0] | DAC1_ADDR[05] |
| DAC1[17] | DAC1_BANK[1] | DAC1_ADDR[01] |
| DAC1[18] | DAC1_BANK[2] | DAC1_ADDR[13] |
| DAC1[19] | DAC1_CAS | DAC1_ADDR[09] |
| DAC1[20] | DAC1_CKE | DAC1_CS[3] |
| DAC1[21] | DAC1_CS[0] | DAC1_ADDR[07] |
| DAC1[22] | DAC1_CS[1] | DAC1_ADDR[08] |
| DAC1[23] | DAC1_CS[2] | DAC1_ADDR[12] |
| DAC1[24] | DAC1_CS[3] | DAC1_CKE |
| DAC1[25] | DAC1_ODT[0] | DAC1_ADDR[11] |
| DAC1[26] | DAC1_ODT[1] | DAC1_ADDR[14] |
| DAC1[27] | DAC1_RAS | DAC1_ADDR[04] |
| DAC1[28] | DAC1_WE | DAC1_ADDR[06] |

Each MID bus 16 on the controller 10 is bit-sliced into two 36-bit bi-directional slices, each feeding one buffer 12. Each buffer 12 drives two 72-bit bi-directional RAM busses, SDR_DATA_A and SDR_DATA_B. The MID bus 16 on each buffer 12 is divided into two 18-bit groups with four strobe pins each. The name format is STB_<dir>_<H/L>[1:0] where the direction is R for read and W for write. The strobes are differential with a positive _H and negative _L wire in each pair. Leaving the last part off refers to the logical pair. The bit indicator shows which half of the data bits the strobe is associated with.

A buffer 12 has one error output signal (PAR_ERR_OUT), and four error inputs from the four DIMMs (DPAR_ERR_L [3:0]). PAR_ERR_OUT indicates that the buffer 12 has encountered an internal error or DIMM parity error. A RESET command on the MIC bus 20 clears all the errors within buffer 12. The error information is stored in the diagnostic register and will be read by the controller 10 whenever PAR_ERR_OUT is asserted and stored in a CSR within the controller 10. The lower eight bits of the diagnostic register are sticky and will stay set once an error has been detected until a reset command clears them. The bits not defined in the table will contain internal state that is TBD and so will be effectively random.

TABLE 2-18

| \multicolumn{7}{c|}{Diagnose data register} |
| --- | --- | --- | --- | --- | --- | --- |
| 55 | 54 | 53 | 52 | 51 | 50 | 49 |
| Write double ODT mode | Two DIMMs installed | DAC Drive Strength | DRAM Drive Strength side B | DRAM Drive Strength side A | DRAM Term Strength side B | DRAM Term Strength side A |
| 48 | 47:42 | 41:36 | 35:32 | 31:29 | 28:24 | 23:14 |
| Memorex mode enable | DDR_DL_B Tune | DDR_DL_A Tune | PLL RANGEA | PLL RANGEB | PLL MULT | PLL Tune |
| 13:12 | 11:8 | 7 | 6 | 5 | 4 | 3:0 |
| Mode bits | Chip revision number | Error detected | reserved | MIT parity error | MIC/MIA parity error | DIMM address error |

DIMM address error—Indicates that the DIMM address buffer has encountered a parity error. (Sticky)

MIC/MIA parity error—The MIC or MIA bus has detected a parity error. (Sticky)

MIT parity error—The MIT bus has detected a parity error. (Sticky)

Error detected—This indicates that an error has occurred and the PAR_ERR_OUT pin is active. (Sticky)

Chip revision number—Indicates what rev chip this is. First rev will be 0.

DRAM Term Strength*—Selects between 75 and 150 ohm termination for the DRAM bus.

DRAM Drive Strength*—Current drive strength of the DRAM output drivers (1=high, 0=low).

Two DIMMs installed—used for read ODT logic (The TAG buffer 12 handles the B side DAC and so gets the B side two DIMMs installed bit and the non-TAG gets the A side.)

Write double ODT mode—determines if one or both ODT pins are active during a write Mode bits—This reports the status of the MODE[1:0] pins.

PLL Tune—The tune bits for the clock PLL.

PLL RANGEA—Output divider setting for core clock on the clock PLL.

PLL RANGEB—Output divider setting for the half speed clock on the clock PLL.

PLL MULT—Multiplier setting for the clock PLL.

DDR_DL_A Tune—Tune bits for the DDR delay module for side A.

DDR_DL_B Tune—Tune bits for the DDR delay module for side B.

TAG write address—The write pointer for the TAG queue.

TAG read address—The read pointer for the TAG queue.

The A and B DRAM busses are swapped in the TAG buffer 12 due to the physical rotation. This means the non-TAG A and TAG B will be programmed the same and vice-versa. Both buffers 12 see the same MIC commands but the TAG buffer 12 will program the B side mode bits when it gets a SET_MR_A and side A when it gets a SET_MR_B. The reporting is not swapped however.

Even though a particular embodiment of the present invention has been illustrated as described herein, the illustrations and description are not intended to limit the scope of the invention. The invention may be embodied in other forms having modifications made therein that duplicate the performance of the invention and obtain the benefits thereof. Reference must be made to the following claims for determination of the actual scope of the invention.

What is claimed is:

1. A memory control apparatus in a computing system comprising:
   a memory controller and a buffer;
   said memory controller and buffer being connected by a bidirectional data bus and a control interface;
   said buffer being connected to a random-access memory bus for read and write operations;
   said buffer comprising data storage areas to buffer data between the memory controller and system memory, said buffer further comprising logical circuits to decode memory interface control commands from said memory controller;
   a data access and control bus connected between the buffer and the system memory to control read and write operations from and to system memory;
   a second buffer serving as a tag buffer, said second buffer being connected to said random-access memory bus for read and write operations;
   said second buffer comprising data storage areas to buffer data between the memory controller and system memory, said buffer further comprising logical circuits to decode memory interface control commands from said memory controller;
   and a data access and control bus connected between the tag buffer and the system memory to control read and write operations from and to system memory; and
   a tag control input signal designating said second buffer as the tag buffer.

2. The memory control apparatus of claim 1, further comprising:
   a memory interface tag bus between the memory controller and the second buffer.

3. A memory control apparatus in a computing system comprising:
   a memory controller and a buffer;
   said memory controller and buffer being connected by a bidirectional data bus and a control interface;
   said buffer being connected to a random-access memory bus for read and write operations;
   said buffer comprising data storage areas to buffer data between the memory controller and system memory, said buffer further comprising logical circuits to decode memory interface control commands from said memory controller; and a data access and control bus connected between the buffer and the system memory to control read and write operations from and to system memory;

wherein the buffer comprises:

a read data queue.

4. A memory control apparatus in a computing system comprising:

a memory controller and a buffer;

said memory controller and buffer being connected by a bidirectional data bus and a control interface;

said buffer being connected to a random-access memory bus for read and write operations;

said buffer comprising data storage areas to buffer data between the memory controller and system memory, said buffer further comprising logical circuits to decode memory interface control commands from said memory controller; and a data access and control bus connected between the buffer and the system memory to control read and write operations from and to system memory;

wherein the buffer comprises:

a write data queue.

5. A memory control apparatus in a computing system comprising:

a memory controller and a buffer;

said memory controller and buffer being connected by a bidirectional data bus and a control interface;

said buffer being connected to a random-access memory bus for read and write operations;

said buffer comprising data storage areas to buffer data between the memory controller and system memory, said buffer further comprising logical circuits to decode memory interface control commands from said memory controller; and a data access and control bus connected between the buffer and the system memory to control read and write operations from and to system memory;

wherein the buffer comprises;

a tag data queue.

6. A method for data transfer between a memory controller and a system memory bus connected to system memory in a computing system comprising:

interposing a buffer between said system memory bus and the memory controller;

providing to said buffer memory interface addresses and memory interface control commands to facilitate said buffer's read and write operations from and to said system memory;

addressing said system memory through said buffer to accomplish read and write operations between the system memory and the memory controller;

decoding in said buffer the memory interface control commands;

temporarily storing data read and write memory data in the buffer during data transfer between the system memory and the buffer;

transferring read and write memory data between said memory controller and said buffer during read and write operations; and interleaving read and write operations in sequences of memory operations between the controller and multiple independent portions of system memory through the buffer.

* * * * *

UNITED STATES PATENT AND TRADEMARK OFFICE
CERTIFICATE OF CORRECTION

PATENT NO. : 7,363,427 B2 Page 1 of 1
APPLICATION NO. : 10/756446
DATED : April 22, 2008
INVENTOR(S) : Theodore Carter Briggs et al.

It is certified that error appears in the above-identified patent and that said Letters Patent is hereby corrected as shown below:

In column 14, line 7, in Claim 5, delete "comprises;" and insert -- comprises: --, therefor.

Signed and Sealed this

Twenty-sixth Day of August, 2008

JON W. DUDAS
*Director of the United States Patent and Trademark Office*